United States Patent
Tilt et al.

(10) Patent No.: US 8,559,766 B2
(45) Date of Patent: Oct. 15, 2013

(54) AUTOMATIC IMAGE CAPTURE

(75) Inventors: Christopher E. Tilt, Portland, OR (US); Rex Howard Stevens, Aloha, OR (US)

(73) Assignee: iParse, LLC, Beaverton, OR (US)

( * ) Notice: Subject to any disclaimer, the term of this patent is extended or adjusted under 35 U.S.C. 154(b) by 177 days.

(21) Appl. No.: 13/136,958

(22) Filed: Aug. 16, 2011

(65) Prior Publication Data

US 2013/0044194 A1 Feb. 21, 2013

(51) Int. Cl.
*G06K 9/20* (2006.01)
*G06K 9/40* (2006.01)
*H04N 5/232* (2006.01)

(52) U.S. Cl.
USPC .................. 382/312; 382/254; 348/211.2

(58) Field of Classification Search
USPC ......... 382/103, 137, 254, 294, 264, 274–275, 382/305, 312; 705/45; 235/379; 455/556.1; 348/207.99, 211.2; 345/156, 157
See application file for complete search history.

(56) References Cited

U.S. PATENT DOCUMENTS 7,593,605 B2 *  9/2009  King et al. .................... 382/313
8,226,011 B2 *  7/2012  Merkli et al. ............ 235/462.46
8,441,441 B2 *  5/2013  Tsai et al. ..................... 345/157

* cited by examiner

*Primary Examiner* — Kanjibhai Patel
(74) *Attorney, Agent, or Firm* — Francis I. Gray

(57) ABSTRACT

An improved automatic image capture system for an intelligent mobile device having a camera guides a user to position the camera so only a single image needs to be automatically captured. A trapezoidal view finder on a display of the intelligent mobile device may be used to orient the camera with respect to a target document so there is an appropriate pitch and roll angle between the camera and the target document to avoid shadows caused by the camera or user. Further the user is guided to maximize the occupancy of the view finder with the document so that the document is maximized within the view finder. When all requisite conditions are satisfied, the camera automatically captures the image of the document for post-processing.

20 Claims, 3 Drawing Sheets

SPLIT VIEW FINDER

TARGET VIEW FINDER

CONTRAST

OCCUPANCY

CORNER DETECTION

AUTOMATIC IMAGE CAPTURE

BACKGROUND OF THE INVENTION

The present invention relates to image processing, and more particularly to an improved automatic image capture method using an intelligent mobile device, such as a wireless telephone having a camera.

Conventional image capturing devices, such as cameras and scanners, typically require human or other external intelligence to select the appropriate image for a specific application. While this is sufficient for some image capture systems, many systems require very precise images for processing.

One such example is the new methodology being used by banking institutions for deposit of checks remotely via an intelligent mobile device, such as a wireless telephone, as exemplified by U.S. Pat. Nos. 7,778,457, 7,949,176 and 7,953,268 entitled "Systems [Methods] for Mobile Image Capture and Processing of Checks [Documents]" by Grigori Nepomniachtchi and assigned to Mitek Systems, Inc. of San Diego, Calif., and further shown in a video at http://www.youtube.com/watch?v=sGD49ybxS2Q. Another video of a method used by USAA Bank is shown at http://www.youtube.com/watch?v=waBQqsSg2NM which describes the USAA Deposit @ Mobile system using an iPhone® mobile device, apparently also using the system/method described in the above patents. With this system/method an appropriate application is downloaded to the iPhone device once the user is qualified by USAA Bank. The user accesses the application on the iPhone device and enters the amount of the check. Then the user uses a camera which is part of the iPhone device to capture an image of both the front and back of the check by, for each instance, lining up the check to be captured within a rectangular graticule or frame on the iPhone viewing screen. Once the images are captured, the user is asked to verify the images and then submit the images to USAA Bank. The captured images of the check are then transmitted via wireless or WiFi to USAA Bank. However it can be tedious and difficult for the user to properly align the image of the check within the rectangular graticule, and motion by the user in taking the picture often results in unusable images. Also in some instances the banking institution may require that the check still be sent to the bank as well since the captured image may not satisfy Federal Reserve Board standards regarding legal replacement checks.

Co-pending U.S. patent application Ser. No. 12/930,630, filed Jan. 12, 2011 by Mike Coleman entitled "Automatic Image Capture" and assigned to iParse, LLC of Beaverton, Oreg., describes an automatic image capture system that does not require human intervention. A user, having the appropriate application downloaded on the intelligent mobile device, aims the device camera at an object or document to be captured. The device camera starts capturing images of the object, and each image is qualified to determine whether it is in focus and within the camera field of view. Qualified images are stored for further processing, such as alignment by an appropriate perspective transformation to assure they each fill a common reference frame, before transmission to a remote location.

One disadvantage of the above-described automatic image capture system is that it still takes the user a little time to aim the camera at the object, preferably directly from above. As a result, the user and camera could cast a shadow on the object, making it more difficult to capture a clear image. Preferably the camera should be able to capture a single image, rather than taking a plurality of images and qualifying each one.

What is desired is an improved automatic image capture system that is easy to use and guides the user to place the camera of the intelligent mobile device in such a position that only a single image needs to be captured.

BRIEF SUMMARY OF THE INVENTION

Accordingly the present invention provides an improved automatic image capture system for an intelligent mobile device having a camera that guides a user to position the camera so only a single image needs to be automatically captured. Application software residing on the intelligent mobile device guides the user, using a trapezoidal view finder on a display of the intelligent mobile device, to orient the camera with respect to a target document so there is an appropriate pitch and roll angle between the camera and the target document to avoid shadows caused by the camera or user. The image of the target document within the view finder is tested for sufficient brightness and contrast with a background on which the document resides. The user is then guided to move closer or farther from the document so that the document is maximized within the view finder. Then the corners of the document are located, and the camera is checked to see is the displayed document image is focused. The camera may also be checked for stability, since excessive movement may cause blurring. When all of the above conditions are satisfied, the application software automatically has the camera capture the image of the document for post-processing. If any of the above conditions fall out of limits prior to the automatic capture step, the process returns to the step immediately preceding the failed step and repeats the steps until all the conditions are met.

The objects, advantages and other novel features of the present invention are apparent from the following detailed description when read in conjunction with the appended claims and attached drawing figures.

DETAILED DESCRIPTION OF THE INVENTION

The system requirements for the improved automatic image capture system described below are:
1. An intelligent mobile device, such as a smart phone, that has a high resolution video camera;
2. An operating system (OS) on the intelligent mobile device that provides access to individual video frame data;
3. A high quality display and graphical library capable of rendering images, graphics and text; and
4. Application software running on the OS that provides the algorithms and guidance to capture an image.

The intelligent mobile device may also contain motion sensors, illumination and network connectivity.

A user is guided by the application software to improve the conditions needed to capture a high quality image suitable for submission to a remote location, such as a financial or other business/legal institution as an example. The image must be of high enough quality, properly framed and properly filtered so that the rate of rejected images at the remote location is as low as possible. By combining the user with the application software, the best possible image capture is possible. The proximity of the application software within the intelligent mobile device provides realtime feedback that reduces user frustration, eliminates delay in round-trip submissions to a back-end system at the remote location, and gives immediate indication of success to the user. The result is a much lower error rate than conventional solutions that ship a generic, un-corrected image to the back-end system that performs the processing without user cooperation. This benefits both the user and the remote location institution with higher customer satisfaction and lower cost of operation.

The user may capture a printed rectangular document, i.e., acquire a centered and cropped image of the document in the form of an electronic image, such as PNG, TIFF, JPEG, etc. files, suitable for transfer across standard internet protocols in the following manner. First, the user places the document on a contrasting, pattern-free surface—generally a dark background since most documents are produced on light material. The user ensures sufficient lighting, and then holds the camera of the intelligent mobile device at a preferred angle with respect to the document to eliminate any shadows. Then the user looks at the device display to see a live video image of the document provided by the camera. The user frames the document within a target view finder displayed on the device, and follows the feedback from the application software to improve camera angle, lighting, contrast, occupancy, orientation, focus and motion stability. When all the conditions are right, the camera automatically captures the image, i.e., takes a picture of the document, and the application software automatically performs post-processing of the image to de-skew and filter the image into a format suitable for reception by the remote location for back-end processing.

Figure 1:
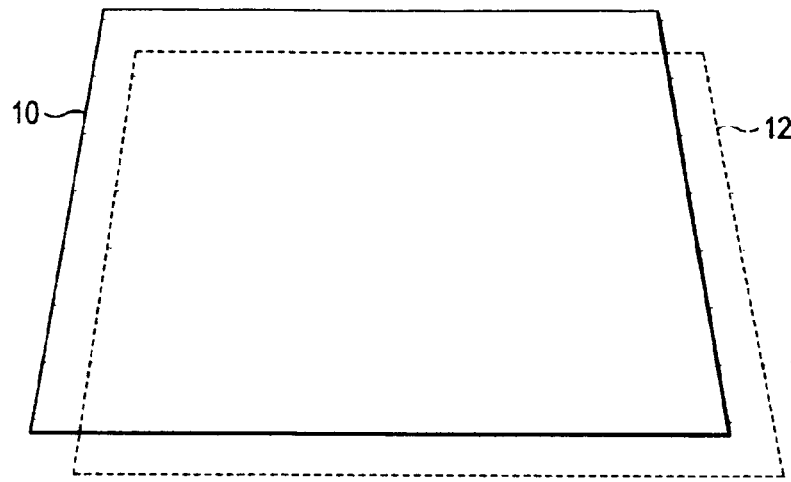
FIG. 1 is a plan view of a split view finder display for automatic image capture according to the present invention.

The application software provides a view finder 10, as shown in FIG. 1, to guide the user to hold the camera at a preferred angle, or pitch, with respect to vertical. Conventionally the camera is held at a zero angle with respect to vertical. However the preferred angle is offset from vertical, such as between fifteen (15) and twenty (20) degrees relative to vertical with respect to the document to be captured. By holding the camera tipped back, the illumination source is much less likely to cast a shadow of the camera and user's hands onto the document. The view finder 10 has a trapezoidal shape, as opposed to the conventional rectangular shape, to match the perspective of the document as seen when looking through the camera when it is tipped back by the preferred angle so the user can naturally align the document's sides and top with the perspective view finder. The view finder 10 is static within the display. A secondary view finder 12 or corresponding shape to the static view finder 10 is provided and moves with the movement of the camera relative to the document. This forms a split view finder together with the static view finder 10. The user is guided to line up the two trapezoidal view finders 10, 12, i.e., move the camera until the secondary view finder is superimposed on the static view finder, which results in the correct pitch and roll (zero degrees). The outlines of the two view finders 10, 12 may be an appropriate negative color, such as cyan or red, so long as the camera is misaligned with the document. When the two view finders 10, 12 are sufficiently superimposed on each other, indicative of proper alignment, the view finders may change to a positive color, such as green, to indicate successful alignment in pitch and roll.

Figure 2:
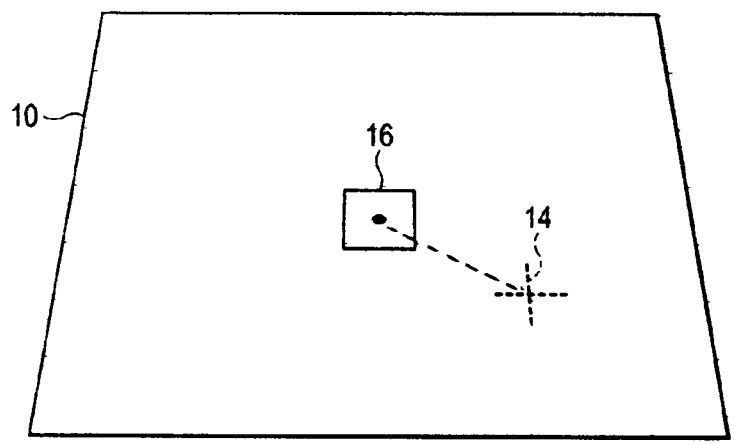
FIG. 2 is a plan view of a target view finder display for automatic image capture according to the present invention.

Alternatively as shown in FIG. 2, a cross-hair 14 may be provided that moves with the pitch and roll of the camera while a small target box 16 is centered statically within the view finder 10. The user moves the camera to move the cross-hair 14 into the target box 16, assuring proper camera alignment with the document. When the camera is misaligned with respect to the document, the target box 16 and cross-hair 14 may have a distinctive color, such as cyan, and the live video feed is darkened significantly. Also the trapezoidal view finder 10 may turn from a solid outline to a dashed outline with some guidance text shown on the display, such as "Tilt camera to align cross-hair within box." When the camera and document are aligned, the video feed of the document is restored to its normal brightness, and the target box 16 and cross-hair 14 change to a positive color, such as green. The target box 16 and cross-hair 14 remain the positive color as the rest of the conditions required for image capture are achieved.

A warning icon is displayed when there is low light on the document to be captured. Brightness may be measured by averaging pixel values that approximate luminance in several areas within the trapezoidal view finder, i.e., taking the average of the pixel values that reside within each sub-area of the document image. This avoids acceptance of strong shadows that might otherwise increase error rates in the post-processing steps. Again, text might be displayed, if the brightness is insufficient, to instruct the user to provide more light for the document.

Figure 3:
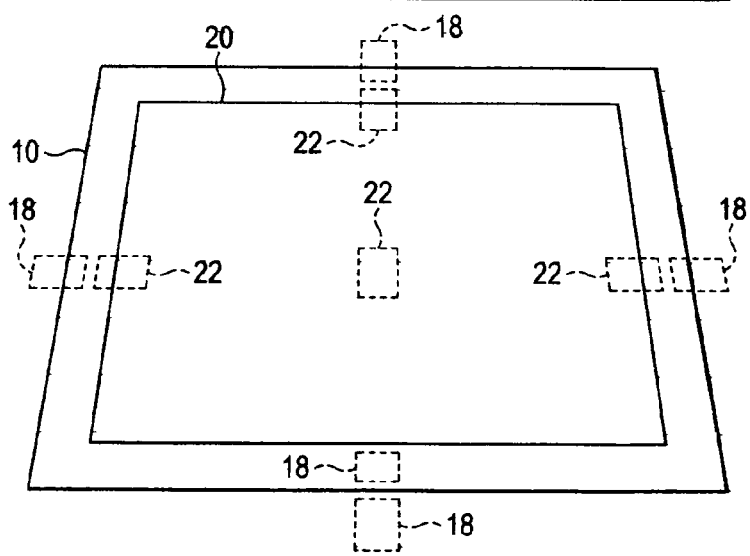
FIG. 3 is a plan view of a contrast display for automatic image capture according to the present invention.

As shown in FIG. 3, a patterned or colored area 18 outside the view finder 10 is used to indicate poor contrast. The application software compares pixels inside and outside the document image 20 in different areas to determine if sufficient brightness contrast exists. A warning icon and text also suggests corrective action to increase contrast, such as changing the background against which the document is placed. Selected pixels 18, 22 both within and outside document image 20 are summed separately, a threshold is created using a center value between the two sums, and the average within the document to that outside the document is compared. A low difference indicates poor contrast.

Figure 4:
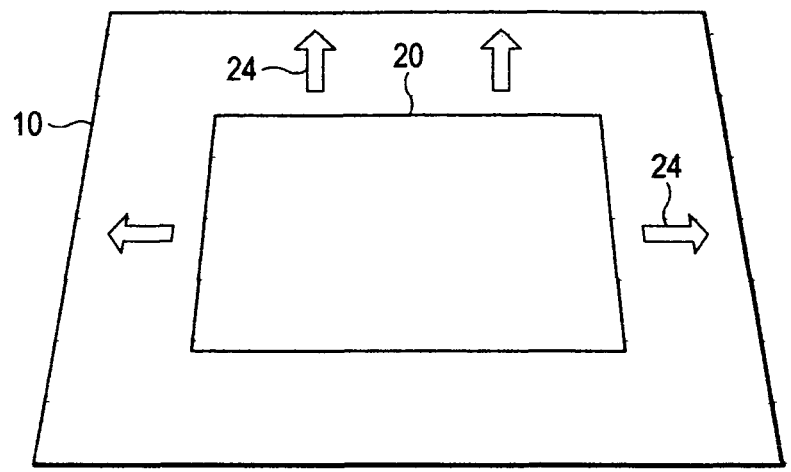
FIG. 4 is a plan view of an occupancy display for automatic image capture according to the present invention.

With camera orientation and brightness/contrast being satisfactory, the user is then guided to fill the view finder 10 with the document 20, as shown in FIG. 4. Using as much of the view finder 10 as possible reduces noise in the final image. Arrows 24 or other indicators on the display guide the user to move the camera closer or farther back to align the document image 20 optimally within the trapezoid view finder 10. The arrows 24 may be colored, such as red. To determine the state of each arrow 24, a first order differential is applied at each of four specific locations and determines if the difference is high enough. This is similar to contrast, but is measured separately at the four points shown by the arrows 24. Each point of measure has an equivalent warning arrow 24 that illuminates when the differential is too low. The four areas are: (1) each side at the center row of the view finder 10—this is a horizontal differential that is maximized when the edge of the document image 20 is within a given offset with the view finder; and (2) top left (set in) and top right (set in)—these are vertical differentials that are maximized when the top edge of the document image is aligned with the top edge of the view finder, minus a few rows. Using two arrows 24 at the top minimizes any rotation of the document image 20, which enables corner detection in the next step. There is no need for bottom arrows, which allows for documents having different aspect ratios, such as business/personal checks and letter/legal sized pages, to be imaged and captured.

As an alternative to using arrows to indicate occupancy, the user may be guided to fill the view finder area by animated movements of the view finder that suggest actions the user should take to improve occupancy. For example, when the camera is too close to the document and the document image exceeds the bounds of the view finder, the view finder may show a repeating expanding motion—the view finder animates a series of increased sizes to suggest pulling back of the camera by the user. Also for example, when the camera is too far away from the document such that the document image is occupying too small an area in the view finder, the view finder may animate a shrinking motion. This would suggest to the user that the camera should be moved closer. Similar animations may be used to suggest moving the camera left or right, up or down, etc. The distances from the edge of the document image to the edges of the view finder would provide the information as to the required direction of movement, i.e., the distance from the top of the document image to the top of the view finder may be significantly greater than the distance from the bottom of the document image to the bottom of the view finder so the camera should be moved up to center the document image within the view finder, as an example.

Figure 5:
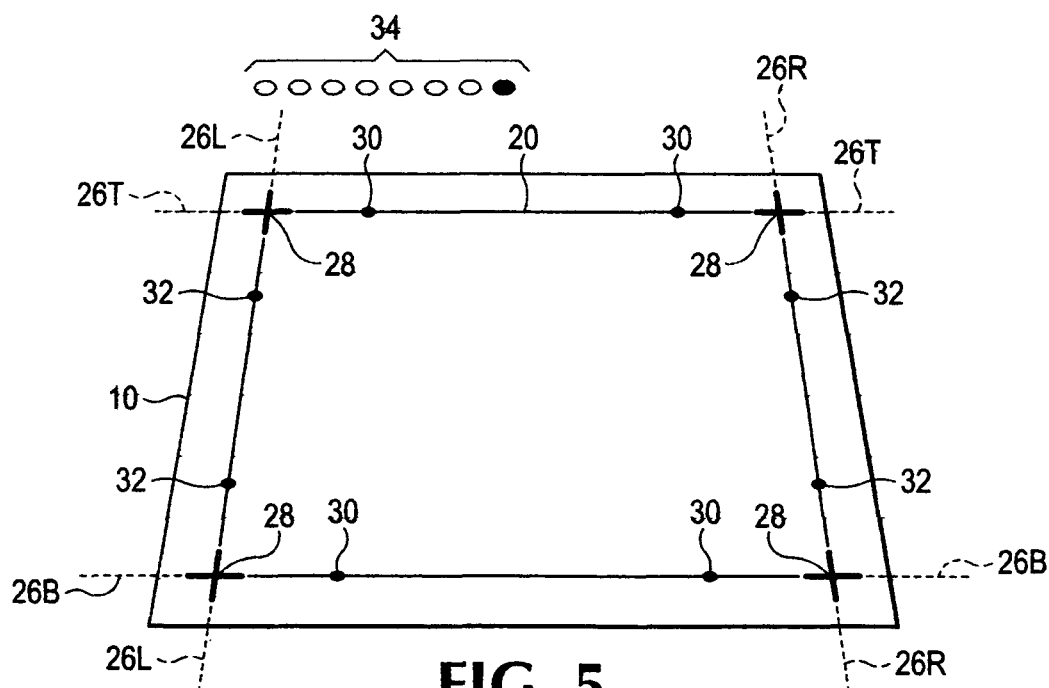
FIG. 5 is a plan view of a corner detection display with status indicators for automatic image capture according to the present invention.

For edge and corner detection as shown in FIG. 5, a first order differential is applied in eight critical areas to determine four lines 26L, R, T, B that make up the outline of the document image 20. The intersections of the four lines 26L, R, T, B determine the corners 28. This assures that a rectangle is present within the optimal area of the view finder 10. This step is very fast. An audible "beep" may be provided to help give the user the feeling of progress each time the four corners 28 are located.

More specifically in each corner the application software tries to find two points as the upper/lower points 30 and the outer points 32. This leads to the four lines: upper, lower, left and right. The left and right lines 26L, R are found by connecting the two outer points 32, and the upper and lower lines 26T, B are found by connecting the two upper and lower points 30 respectively. To find each point 30, 32, a first order differential is used starting, for example, ten percent (10%) outside the view finder 10 and moving inwards until ten or twenty percent (10-20%) inside the view finder. The point at which the maximum luminance change occurs, i.e., the transition between the background and the document image 20, is considered the edge of the document. This process is repeated for each of the eight points 30, 32. Finally projections of the lines 26L, R, T, B are intersected to produce the corners 28. The four corners are used in post-processing to improve performance and accuracy of the final document bounds detection.

The application software provides a warning while the camera is automatically focusing to give the user feedback that the capture process is still proceeding.

The final condition, if necessary, is stability, where motion sensors are used to measure the physical motion of the intelligent mobile device. This condition may not be necessary for image capture, but may be included in the event there is a possibility of excessive motion during the capturing of the final image. Excessive motion may cause blurring and increase the error rate in post-processing. Accelerometer data is acquired from the intelligent mobile device and filtered using a lowpass filter. High vibration causes blurs, but low vibration does not. Excessive low frequency movement, such as moving closer to the document, may trigger an "out-of-focus" condition that would return the application software to the focus step. If high frequency motion, such as camera vibration, is detected, a warning icon and corrective help text may be provided on the device display until stability is achieved. Once stable, all of the conditions required to capture the image have been set, and the application software automatically captures the image of the document and proceeds to the post-processing and filtering, as described in the afore-mentioned pending U.S. patent application Ser. No. 12/930,630.

Figure 6:
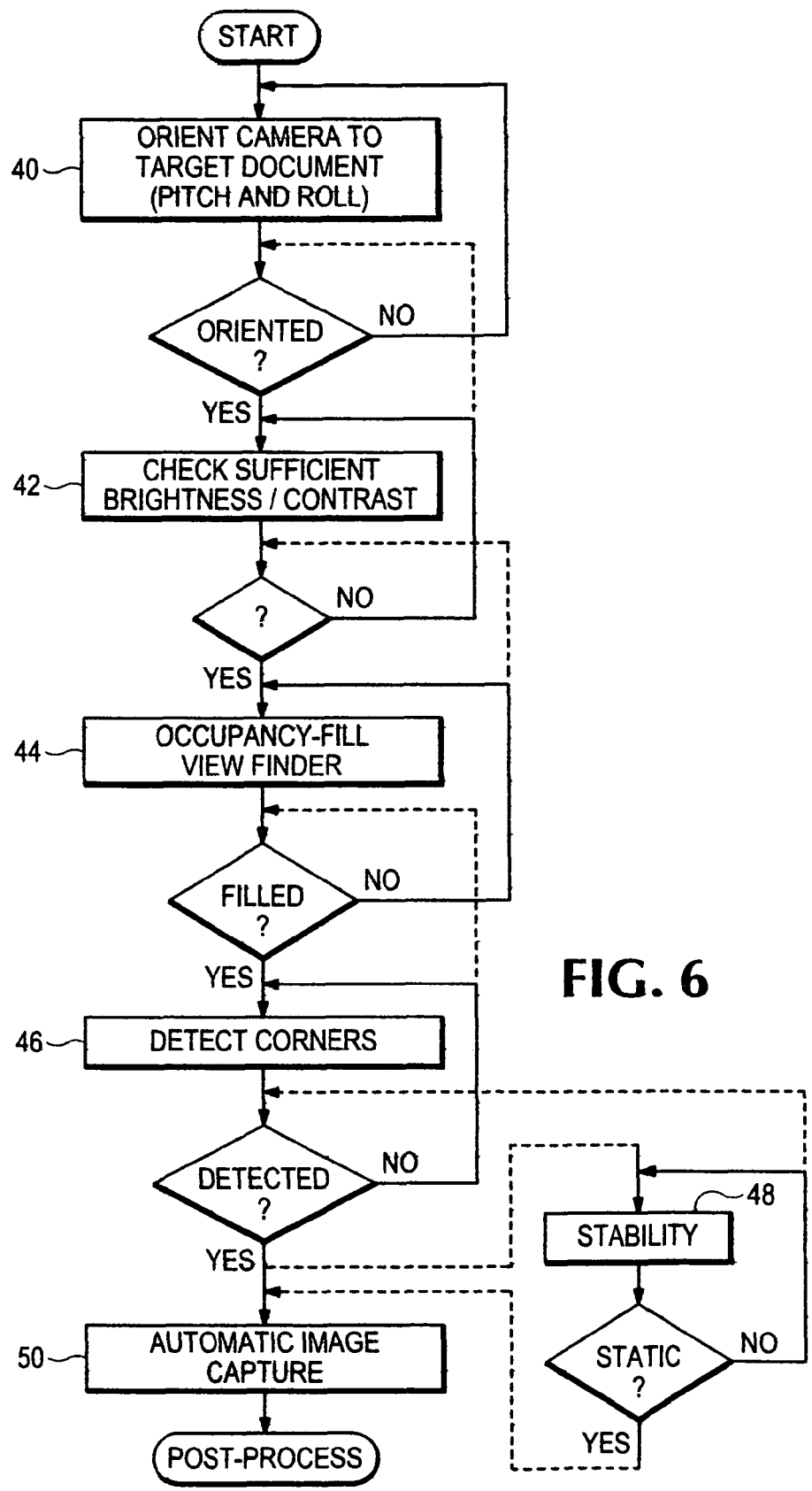
FIG. 6 is a flow diagram view of the application software for automatic image capture according to the present invention.

All of these steps are combined into a framework that guides the user through the required conditions in a natural order, as shown in FIG. 6. When the application software starts, the first step 40 is orientation of the camera with respect to the target document. The next step 42 is to check for sufficient brightness and contrast for the target document. At this point occupancy is checked as the next step 44 to assure the document image fills the view finder. The final step 46 is to detect the corners of the document image. An additional 48, as necessary or desirable, is to check for excessive motion to assure sufficient stability of the camera with respect to the target document to prevent blurring. Once all the conditions of the previous steps are satisfied, then the automatic image capture 50 of the target document occurs and the captured image is passed to post-processing algorithms before being transmitted to the remote location. In the event that any of the conditions of prior steps fail before the image capture step 50, the process returns to the immediately preceding step of the failed condition and repeats the ensuing steps.

These steps may include other conditions not listed above which have already been described in the pending U.S. patent application Ser. No. 12/930,630. The user is only provided with the lowest "out of bounds" conditions that require corrective action. There is no sense trying to fix "focus" if there is not enough "brightness." Likewise view angle adjustment is the first step 40 because moving the camera around changes all of the other conditions. A progress meter 34, shown in FIG. 5 for example, that has a simple color indicator for each step may be presented at the top of the view finder 10 to give the user feedback as to where they are in the process of getting a good image capture of the document.

By combining the user's eyes and problem solving ability with supportive image processing algorithms, the application software guides the user to capture a high quality image of the document sufficient to transmit to the remote location and be accepted at a very low error rate, giving the user an excellent experience while providing low cost of business.

Thus the present invention provides an improved automatic image capture of a target document using an intelligent mobile device having a camera by providing application software that operates interactively with a user to assure that a series of conditions are achieved, starting with camera tilt relative to the target document, before the application software causes the camera to automatically capture the image of the target document for post-processing and subsequent transmission to a remote location.

What is claimed is:

1. A method of automatic image capture of a target document using an intelligent mobile device having a camera comprising the steps of:
    showing a view finder on a display of the intelligent mobile device;
    guiding a user to maximize occupancy of the view finder with an image of the target document as a first condition; and
    automatically capturing the target document image for post-processing when the occupancy is maximized;
    wherein a shape of the view finder comprises a trapezoidal shape such that when a preferred pitch and roll angle of the camera with respect to the target document is achieved, the camera is tipped back from vertical and there is no shadow from the camera or user within the view finder.

2. The method as recited in claim 1 further comprising the step of:
directing the user to orient the camera with respect to the target document so that the target document image is oriented to correspond to a given shape of the view finder prior to the capturing step.

3. The method as recited in claim 1 further comprising the step of:
testing the target document for sufficient brightness and contrast with respect to a background for the target document as a second condition prior to the capturing step.

4. The method as recited in claim 3 further comprising the step of:
determining the corners of the target document image within the view finder as a third condition prior to the capturing step.

5. The method as recited in claim 4 further comprising the step of:
assuring focus of the camera with respect to the target document as a fourth condition prior to the capturing step.

6. The method as recited in claim 5 further comprising the step of repeating the steps of claims 1 and 3-5 should any of the conditions fall outside acceptable parameters prior to the capturing step.

7. The method as recited in claim 5 further comprising the step of checking stability of the camera with respect to the target document prior to the capturing step.

8. The method as recited in claim 1 wherein the guiding step comprises the steps of:
displaying the view finder on the display as a static view finder;
displaying a secondary view finder on the display that is oriented with the camera and moves as the camera moves relative to the target document; and
orienting the camera with respect to the target document so that the secondary view finder is superimposed on the static view finder, indicative of the appropriate positioning of the target document image within the view finder.

9. The method as recited in claim 1 wherein the guiding step comprises the steps of:
displaying a target box at the center of the view finder on the display; displaying a cross-hair on the display that is tied to motion of the camera; and
orienting the camera with respect to the target document so that the cross-hair is within the target box, indicative of the appropriate positioning of the target document image within the view finder.

10. The method as recited in claim 1 wherein the guiding step comprises the step of:
animating an indicia on the display to provide the user with information as to which direction to move the camera to maximize occupancy.

11. The method as recited in claim 10 wherein the animating step comprises the steps of:
determining a distance from each edge of the target document image to the corresponding edge of the view finder;
based upon the distances initiating the direction in which the camera should be moved to maximize occupancy; and
moving the indicia in a manner to indicate the direction to the user.

12. The method as recited in claim 11 wherein the direction is selected from the group consisting of in or out, left or right, up or down and rotate.

13. A method of automatic image capture of a target document using an intelligent mobile device having a camera comprising the steps of:
showing a trapezoidal view finder on a display of the intelligent mobile device;
guiding a user of the intelligent mobile device to orient the camera at an appropriate pitch and roll angle with respect to the target document so an image of the target document has approximately the same trapezoidal shape on the display as the trapezoidal view finder and so that the camera and user do not cast a shadow on the target document image; and
automatically capturing the target document image for post-processing when the target document image satisfies required conditions within the trapezoidal view finder.

14. The method as recited in claim 13 further comprising the step of:
directing the user to maximize occupancy of the trapezoidal view finder with the target document image as one of the required conditions prior to the capturing step.

15. The method as recited in claim 14 further comprising the step of:
testing the target document for sufficient brightness and contrast with a background of the target document as one of the required conditions prior to the capturing step.

16. The method as recited in claim 15 further comprising the step of:
determining the corners of the target document image within the trapezoidal view finder as one of the required conditions prior to the capturing step.

17. The method as recited in claim 16 further comprising the step of:
assuring focus of the camera with respect to the target document as one of the required conditions prior to the capturing step.

18. The method as recited in claim 17 further comprising the step of:
repeating the steps of claims 13-17 should any of the required conditions fall outside acceptable parameters prior to the capturing step.

19. The method as recited in claim 13 wherein the guiding step comprises the steps of:
displaying the trapezoidal view finder on the display as a static trapezoidal view finder;
displaying a secondary trapezoidal view finder on the display that is oriented with the camera and moves as the camera moves relative to the target document; and
orienting the camera with respect to the target document so that the secondary trapezoidal view finder is superimposed on the static trapezoidal view finder, indicative of the appropriate positioning of the target document image within the static trapezoidal view finder.

20. The method as recited in claim 1 wherein the guiding step comprises the steps of:
displaying a target box at the center of the trapezoidal view finder on the display;
displaying a cross-hair on the display that is tied to motion of the camera; and
orienting the camera with respect to the target document so that the cross-hair is within the target box, indicative of the appropriate positioning of the target document image within the trapezoidal view finder.

\* \* \* \* \*